April 15, 1941.　　　　J. MIHALYI　　　　2,238,499
SHUTTER TRIPPING DEVICE
Filed Jan. 4, 1940
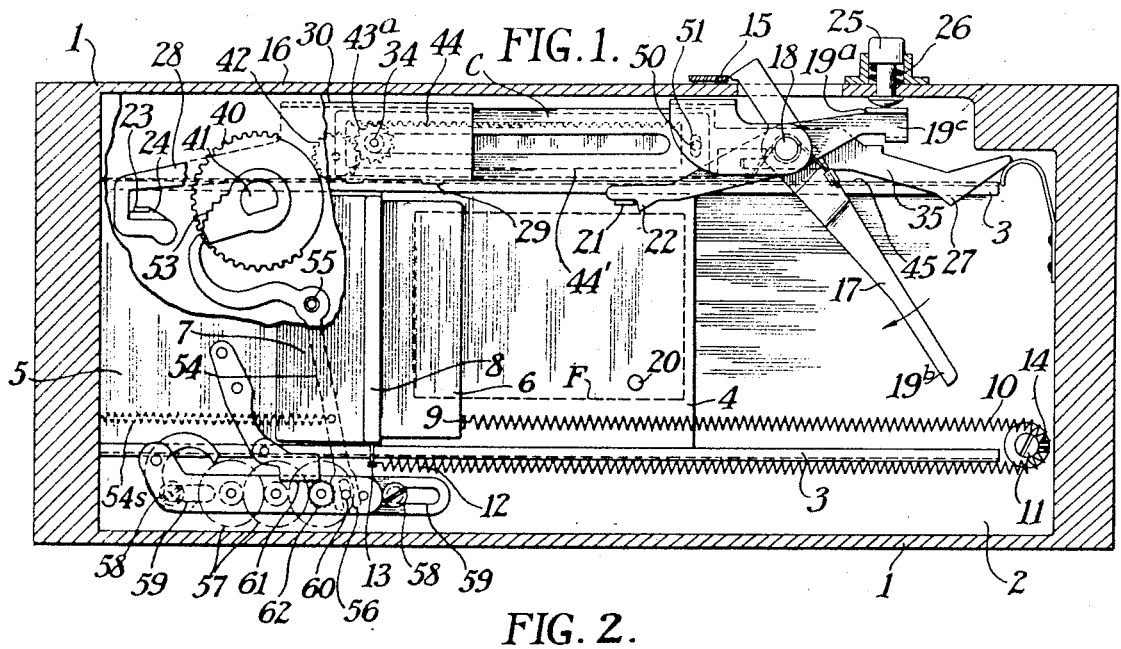
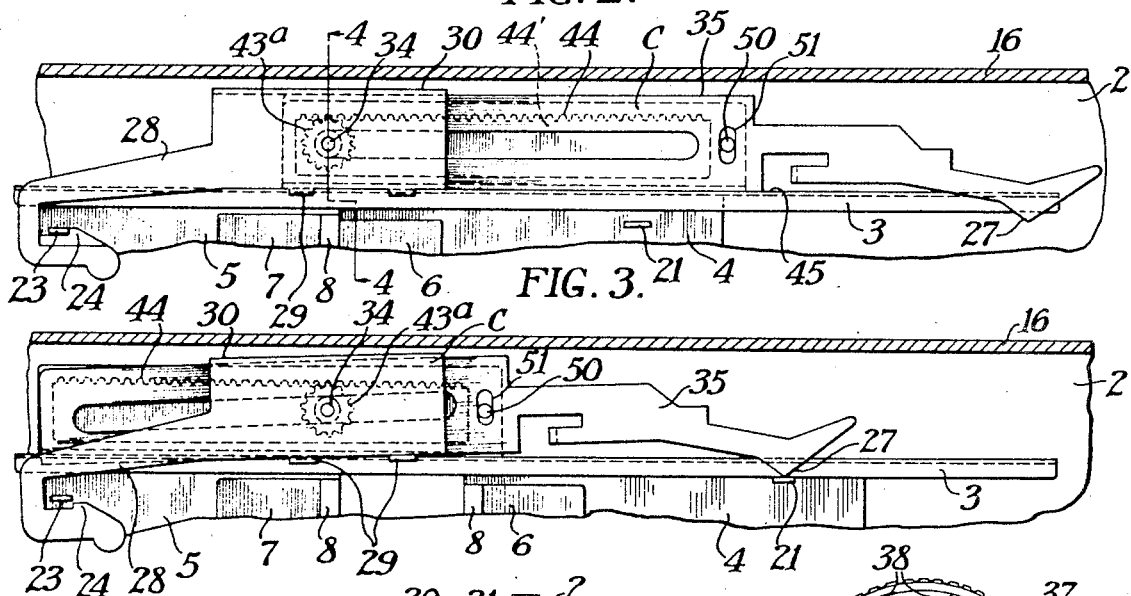
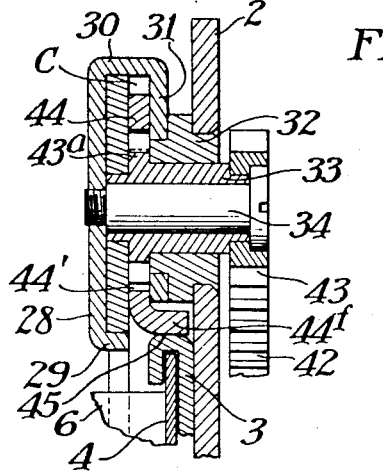
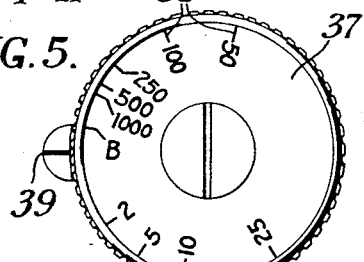
JOSEPH MIHALYI
INVENTOR
BY
ATTORNEYS Patented Apr. 15, 1941

2,238,499

UNITED STATES PATENT OFFICE 2,238,499

SHUTTER TRIPPING DEVICE

Joseph Mihalyi, Rochester, N. Y., assignor to Eastman Kodak Company, Rochester, N. Y., a corporation of New Jersey Application January 4, 1940, Serial No. 312,397

5 Claims. (Cl. 95—55)

This invention relates to photography and more particularly to a simple type of focal plane shutter.

One object of my invention is to provide a shutter of the type in which one shutter leaf is released after the other shutter leaf with a shutter tripping mechanism which will insure the operation of the second shutter blade in exact timed relation with respect to the operation of the first shutter blade. Another object of my invention is to provide a shutter in which the setting of the speed can be accurately accomplished, even though the graduations on the speed dial may be close together. Still another object of my invention is to provide an adjustable lever which acts as a latch for the second shutter blade which may be tripped by the first shutter blade after the two blades have moved a predetermined distance, and to provide a means for always tripping the second shutter in predetermined time with respect to the tripping of the first shutter. Other objects will appear from the following specification, the novel features being particularly pointed out in the claims at the end thereof.

In my copending application for camera shutters, Serial No. 247,423, filed December 23, 1938, I have shown a shutter mechanism of the general type shown herein. However, my present application is directed to an improved form of shutter trip which has been designed to secure more accurate operation of the shutter blades and a more accurate determination of the speed indicated on the setting dial.

In my copending application Serial No. 312,399 filed January 4, 1940, for Automatic exposure mechanism for shutters, I have described and claimed the two mechanisms for obtaining automatic shutter times, the first for relatively fast exposures, such as from 1/1000 to 1/50 of a second, and the second for relatively slow exposures, such as from 1/25 to 1/2 of a second. The present application embodies many of the features shown in this copending application.

Coming now to the drawing, wherein like reference characters denote like parts throughout:

Fig. 1 is a sectional view through a camera casing showing a portion of the front plate supporting shutter mechanism embodying a latch constructed in accordance with and illustrating a preferred form of my invention.

Fig. 2 is a fragmentary detail view showing the latch mechanism for the second shutter blade in position for a slow exposure.

Fig. 3 is a view similar to Fig. 2, but with the parts in position for a relatively fast automatic exposure.

Fig. 4 is an enlarged sectional view on line 4—4 of Fig. 2, and

Fig. 5 is a plan view of the setting dial mechanism removed from the camera.

As indicated in Fig. 1, a preferred embodiment of my invention may include a camera casing 1, including a front plate 2, which carries the shutter mechanism which may be substantially the same as shown in my first-mentioned copending application, insofar as the structure of the shutter leaves and slideway, and many other parts go. The front plate 2 may be provided with a pair of rails 3 on which are mounted two shutter plates—a first shutter plate 4 and a second shutter plate 5. Each of these shutter plates has a rearward extension, 6 on plate 4, and 7 on plate 5, which have overlapping edges 8 to make a light-tight connection, so that when these two shutter plates are set by a mechanism which will be hereinafter more fully described, they will pass over the exposure frame F without permitting light to enter from the objective.

Attached to the shutter plate 4 at 9 is one end of a spring 10 which passes about a stud 11, so that the other end 12 of the spring may be attached at 13 to the second shutter plate 5.

In accordance with my copending application Serial No. 312,398, filed January 4, 1940 for Shutter spring for sliding shutters, I prefer to provide a means on the stud 11, here shown as an upstanding flange 14, which will enter between convolutions of the spring so that the spring 10 may be adjusted to exert an equal force on each of the two shutter leaves irrespective of the time of their operation.

In order to set the shutters to the position shown in Fig. 1, a lever 15 on the top wall 16 of the camera may be swung to the right with reference to Fig. 1, thus swinging the lever 17, pivoted at 18, in the direction shown by the arrow, so that the end 19b of this lever, through its engagement with the pin 20 on the first shutter plate 4, will move the plates together to the position shown in Fig. 1, in which the shutter plate 4 is held by the lug 21, engaging the latch member 22, and the second shutter plate 5 is held in position by means of a lug 23 engaging a latch member 24. The latch member 22, which holds the first shutter plate 4, is also pivoted upon the stud 18 and it includes an arm 19c having a flange 19a adapted to be depressed by the trigger button 25, normally thrust upwardly by a spring 26. In order to release the first shutter 4, the trigger 25 may be depressed, raising the latch 22 so that the lug 21 can move with the shutter plate 4, under the impulse of the spring 10. As this shutter slides along the rails 3, the lug 21 comes beneath a downwardly extending projection 27 on the latch mechanism for the second shutter, which is best shown in Fig. 2. This latch for the second shutter consists of a latch element 24 for engaging the upstanding lug 23 of the shutter plate 4 at one end and the length of this lever between the latch 24 and the projection 27 is adjustable. Latch 24 is carried on the end of an arm 28 which, as shown in Fig. 4, has formed-over lugs 29 on the bottom edge and a formed-over flange 30 on the upper edge, there being a rear wall 31 providing a bearing 32 for the sleeve shaft 33 surrounding the stud 34. The stud 34 forms a pivot, about which the adjustable arm may swing so that when the projection 27 is struck by the lug 21 on the first shutter plate 4, it may swing upwardly, at the same time swinging the latch member 24 downwardly and permitting the lug 23, carried by the second shutter plate 5, to be released, whereby the second shutter plate, under the influence of spring 10, may quickly follow the first plate.

It is obvious that the time of release of the second plate, after the time of release of the first plate, will control the exposure. If this release takes place before the first shutter plate has moved far from the second shutter plate, the exposure will be a fast one, and consequently, if this plate should move to open up a slot of say 1/16 of an inch, so that the two plates would cross the exposure aperture with such a slit, an extremely rapid exposure could be obtained.

It is also obvious that if the lever is extended to its limit, and the projection 27 is as far as possible from the latch 24 the lug 21, carried by the shutter plate 4, will have to move a long distance before the second shutter plate is released, and a correspondingly long exposure can be obtained.

In order to adjust the distance of the projection 27 from the latch member 24, the arm 35, which carries the downwardly extending projection 27, is made so that it may telescope between the upper wall 30 and the lower lugs 29 of the arm 28. These two arms 28 and 35 therefore may swing as a unit about the stud pivot 34, but they may be adjusted to vary their length in the following manner:

On the outside of the camera, there is a dial 37, as shown in Fig. 5. This has a series of graduations 38, and by bringing a graduation opposite the pointer 39, the parts are set for producing the selected exposure. It will be noticed from Fig. 1, that there is a mutilated gear 40 which is carried by a shaft 41 and that the gears 42 and 43, when turned by the teeth on the mutilated gear, will cause a rack 44 to slide. This rack is guided in the present instance upon the upper edge 45 of the upper rail 3 which supports the shutter blades, and consequently, while it can slide upon this rail and slide about the gear 43a, which lies beneath the rack, it cannot turn upon the pivot 34. However, since the lever, composed of the arms 28 and 35, must turn, the rack is provided with a pin 50, projecting through a slot 51 in the lever, so that the downward projection 27 will be moved with the rack and will be permitted to swing through the pin and slot connection therewith a sufficient distance to operate the second latch member independently of the rack 44.

It should be noted that the teeth of the rack 44 project downwardly into a cut-out or opening 44' in the rack. This is to receive the pinion 43a which lies in the cut-out with the teeth meshing with the teeth of rack 44. Pinion 43a and pinion 43 turn together as a unit on sleeve shaft 33, which turns in bearing 32 and constitutes a pivot on which the lever 28 may rock when the downwardly projecting lug 27 is raised to lower latch 24.

In order to prevent rocking of the rack 44 with the lever 28, the lower edge of the rack is provided with a flange 44f, which slides on the top of rail 3 and thus may move longitudinally of the stud 34, but cannot turn about it. Since the rack 44 (Fig. 4) is not confined by the lugs 29, and since there is a clearance over the top of the rack at C, the rotative movement of lever 24 does not affect the rack. Longitudinal movement of the rack is, however, transmitted to the variable length arm 35 through the pin 50 and slot 51, so that movement of the rack 44 will immediately alter the distance between latch 24 and the latch operating lug 27.

Fig. 1 indicates the mutilated gear 40 in position in which the teeth do not mesh with the pinion 42 and in which a cam member 53 has positioned the lever arm 54, which is pivoted at 55 to the frame and which has a fork 56 which is swung to a position to cause a predetermined prolonged exposure by means of the gear train, designated broadly as 57. A spring 54s tends to swing the lever 54 in a clockwise direction to engage the upper end of said lever with cam 53. This gear train is slidably mounted by means of pins 58 and slots 59 on the front plate 2 and the fork 56, through the pin 60, adjusts the gear train in various positions so that a pivoted rack 61, by engaging a toothed wheel 62, may delay the operation of the second shutter blade. Since the delayed action mechanism forms the invention of my above mentioned copending application Serial No. 312,399 it need not be further described herein.

The operation of the adjustable latch member for the second shutter plate is as follows: Assuming that an exposure of 1/100 of a second is to be made, the dial 37 is turned until the proper graduation 38 appears opposite the pointer 39. This movement causes the teeth of the mutilated gear 40 to mesh with the pinion 42 which turns the gear 43 so that the rack 44 will move the downward projection 27 to the proper position.

The shutter is then set by swinging the lever 17 so that a pin 20 will carry the shutter plate 4, together with the shutter plate 5, to the position shown in Fig. 1, in which the shutter plate 4 will be latched, through the lug 21 and latch 22, and the second shutter plate 5 will be latched, through the lug 23 and the latch 24.

By depressing the shutter trigger 25, the latch 22 will be raised. Spring 10 will draw the shutter plate 24 along the rails 3 until the lug 21 strikes the projection 27, causing this lever to rock about the pin 34, lowering the latch element 24, thereby releasing the lug 23. The spring 10, therefore, draws the second shutter plate after the first, causing the two plates with the slot between them to travel across the exposure frame E and make the exposure.

This timing is accurately accomplished because even though the graduations on the dial 37 may lie close together in places, since the rack does not tend to rotate with respect to the gear, it will not tend to throw off the delicate width adjustment between the projection 27 and the latch 24.

What I claim is:

1. In a camera shutter including a slideway, a pair of shutter plates movably carried in the slideway, each having an upstanding lug, and a spring for moving the shutter plates, the combination with a pivotally mounted first and a second latch lever, each positioned to engage one of the shutter plates to hold them under spring tension, of means for manually releasing said first latch lever to release the first shutter plate, said second latch lever comprising a two-part variable length arm, said arm including a latch element engaging said second shutter plate and including a release lug projecting into the path of movement of the first shutter plate to be operated thereby to release the second shutter plate, a guideway on the shutter, an adjustable member mounted to move solely in a longitudinal direction in the guideway, connections between the two-part variable length arm and the adjustable member for varying the length of the arm from the adjustable member, said connections being so formed that said variable length arm may swing about its pivotal support to release the second shutter plate latch when the lug projecting into the path of the first shutter plate is operated thereby.

2. In a camera shutter including a slideway, a pair of shutter plates movably carried in the slideway, each having an upstanding lug, and a spring for moving the shutter plates, the combination with a pivotally mounted first and a second latch lever, each positioned to engage one of the shutter plates to hold them under spring tension, of means for manually releasing said first latch lever to release the first shutter plate, said second latch lever comprising a two-part variable length arm, said arm including a latch element engaging said second shutter plate and including a release lug projecting into the path of movement of the first shutter plate to be operated thereby to release the second shutter plate, the second lever including a rack on one lever part, a slideway for confining the movement of the rack to longitudinal movement, a pinion meshing with the rack carried by the shutter for sliding said rack to change the length of the variable length lever, means for supporting the other variable length arm including said pivot and pin and slot so positioned relative to the pivot as to transmit longitudinal movement to the other variable length lever and permit swinging movement of said lever independently of the rack, whereby different shutter speeds may be obtained by turning the pinion.

3. In a camera shutter including a slideway, a pair of shutter plates movably carried in the slideway, each having an upstanding lug, and a spring for moving the shutter plates, the combination with a pivotally mounted first and a second latch lever, each positioned to engage one of the shutter plates to hold them under spring tension, of means for manually releasing said first latch lever to release the first shutter plate, said second latch lever comprising a two-part variable length arm, said arm including a latch element engaging said second shutter plate and including a release lug projecting into the path of movement of the first shutter plate to be operated thereby to release the second shutter plate, the second two-part variable length lever including telescoping sections carrying the second shutter latch element, and the releasing lug lying in the path of the first shutter, said pivotal mount on which the second lever may turn supporting a pinion, a rack meshing with the pinion, a track for guiding the rack and confining the movement thereof solely to longitudinal movement, means for moving the lug carrying lever section relatively to the rack about said pivot, and connections between said rack and said lug carrying lever section for transmitting longitudinal movement from said rack to said lever section to vary the relative operation of the shutter plates.

4. In a camera shutter including a slideway, a pair of shutter plates movably carried in the slideway, each having an upstanding lug, and a spring for moving the shutter plates, the combination with a pivotally mounted first and a second latch lever, each positioned to engage one of the shutter plates to hold them under spring tension, of means for manually releasing said first latch lever to release the first shutter plate, said second latch lever comprising a two-part variable length arm, said arm including a latch element engaging said second shutter plate and including a release lug projecting into the path of movement of the first shutter plate to be operated thereby to release the second shutter plate, the second two-part variable length lever including telescoping sections carrying the second shutter latch element and the releasing lug lying in the path of the first shutter, said pivotal mount on which the second lever may turn supporting a pinion, a rack meshing with the pinion, a track for guiding the rack and confining the movement thereof solely to longitudinal movement, means for moving the lug carrying lever section relatively to the rack about said pivot, and connections between said rack and said lug carrying lever section comprising a pin and a slot transverse to the track guiding the rack longitudinally for transmitting motion from the rack to the lug carrying lever section and for permitting movement of the said lever section about the said pivotal support therefor.

5. In a camera shutter including a slideway, a pair of shutter plates movably carried in the slideway, each having an upstanding lug, and a spring for moving the shutter plates, the combination with a pivotally mounted first and a second latch lever, each positioned to engage one of the shutter plates to hold them under spring tension, of means for manually releasing said first latch lever to release the first shutter plate, said second latch lever comprising a two-part variable length arm, said arm including a latch element engaging said second shutter plate and including a release lug projecting into the path of movement of the first shutter plate to be operated thereby to release the second shutter plate, the second two-part variable length lever including telescoping sections carrying the second shutter latch element and the releasing lug lying in the path of the first shutter whereby by telescoping the sections, the release of the first and second shutters may be varied, said second lever being mounted upon said pivotal mount to swing the releasing latch to release the second shutter when the releasing lug is operated by the first shutter, means for adjusting the distance between the latch and releasing lug and varying the relationship of the telescoping lever sections comprising a pinion, a rack meshing with the pinion, means for guiding the rack solely in a longitudinal direction, and connections between the longitudinally movable rack and the pivotally mounted telescoping section lever for varying the length of said lever whereby the telescoping lever may swing about said pivotal support to release the second shutter after the operation of the first shutter.

JOSEPH MIHALYI.